US011915895B2

(12) United States Patent
Goebels et al.

(10) Patent No.: US 11,915,895 B2
(45) Date of Patent: Feb. 27, 2024

(54) INTERRUPTER UNIT HAVING A VACUUM TUBE AND AN INSULATING HOUSING

(71) Applicant: Siemens Energy Global GmbH & Co. KG, Munich (DE)

(72) Inventors: Tobias Alexander Goebels, Nordrhein-Westfalen (DE); Sylvio Kosse, Erlangen (DE); Paul Gregor Nikolic, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 209 days.

(21) Appl. No.: 17/631,564

(22) PCT Filed: Apr. 28, 2020

(86) PCT No.: PCT/EP2020/061663

§ 371 (c)(1),
(2) Date: Jan. 31, 2022

(87) PCT Pub. No.: WO2021/018426

PCT Pub. Date: Feb. 4, 2021

(65) Prior Publication Data

US 2022/0319786 A1 Oct. 6, 2022

(30) Foreign Application Priority Data

Jul. 30, 2019 (DE) ..................... 10 2019 211 345.1

(51) Int. Cl.
*H01H 33/662* (2006.01)

(52) U.S. Cl.
CPC ................. *H01H 33/66207* (2013.01); *H01H 2033/66223* (2013.01)

(58) Field of Classification Search
CPC ........... H01H 33/66207; H01H 33/662; H01H 2033/6623; H01H 2033/66223
(Continued)

(56) References Cited

U.S. PATENT DOCUMENTS 4,002,867 A 1/1977 Cherry
8,785,802 B2 * 7/2014 Shang .............. H01H 33/66207 218/120
(Continued)

FOREIGN PATENT DOCUMENTS

CN 1320941 A 11/2001
CN 101268536 A 9/2008
(Continued)

*Primary Examiner* — William A Bolton

(74) *Attorney, Agent, or Firm* — Laurence A. Greenberg; Werner H. Stemer; Ralph E. Locher

(57) ABSTRACT

An interrupter unit includes a vacuum switch tube and an insulating housing. The insulating housing has an inner surface. The vacuum switch tube is bordered at least partially by an electrically insulating structure material having an outer surface. The insulating housing at least partially surrounds the vacuum switch tube. In operation, inner surface of the insulating housing and outer surface of the vacuum switch tube are separated by an adhesion layer. The inner surface and the outer surface are provided at least partially with an electrically conductive layer such that, in a boundary region between vacuum switch tube and insulating housing, the following layer sequence is directed radially outwards from a switch axis: structure material of vacuum switch tube; outer surface of structure material; conductive layer on outer surface of structure material; adhesion layer; conductive layer on insulating housing; inner surface of insulating housing; volume material of insulating housing.

10 Claims, 2 Drawing Sheets

(58) Field of Classification Search
USPC ................. 218/118, 132, 134, 138, 139, 155
See application file for complete search history.

(56) References Cited

U.S. PATENT DOCUMENTS

| | | | | |
|---|---|---|---|---|
| 10,049,840 | B2 * | 8/2018 | Gentsch | H01H 33/6606 |
| 2004/0232113 | A1 * | 11/2004 | Kynast | H01H 33/662 218/136 |
| 2004/0242034 | A1 * | 12/2004 | Rinehart | H01H 33/662 439/100 |
| 2006/0011589 | A1 * | 1/2006 | Hering | H01H 33/66207 218/118 |
| 2008/0142485 | A1 | 6/2008 | Gentsch et al. | |
| 2016/0181027 | A1 | 6/2016 | Cao et al. | |
| 2017/0207039 | A1 * | 7/2017 | Pohle | H01H 33/66207 |
| 2017/0213675 | A1 | 7/2017 | Hartmann et al. | |
| 2019/0172667 | A1 * | 6/2019 | Graskowski | H01H 33/66261 |

FOREIGN PATENT DOCUMENTS

| | | | |
|---|---|---|---|
| CN | 106537545 | A | 3/2017 |
| DE | 102015213738 | A1 | 1/2017 |
| EP | 3486934 | A1 | 5/2019 |
| JP | H05298974 | A | 11/1993 |
| JP | 2004306528 | A | 11/2004 |
| JP | 2013089376 | A | 5/2013 |
| JP | 2019033021 | A | 2/2019 |
| WO | WO 0041199 | A1 | 7/2000 |
| WO | WO 02069352 | A1 | 9/2002 |

* cited by examiner

INTERRUPTER UNIT HAVING A VACUUM TUBE AND AN INSULATING HOUSING

FIELD AND BACKGROUND OF THE INVENTION

The invention relates to an interrupter unit including a vacuum switch tube and an insulating housing, the insulating housing having an inner surface and the vacuum switch tube being bordered at least partially by an electrically insulating structure material having an outer surface, the insulating housing at least partially surrounding the vacuum switch tube and, in an operational state of the interrupter unit, the inner surface of the insulating housing and the outer surface of the vacuum switch tube being separated by an adhesion layer.

To avoid climate-damaging sulfur hexafluoride, modern interrupter units are filled with alternative insulating gases on the one hand or combinations of vacuum switch tubes with air insulation surrounding them are effective. In the second case, a conventional design is configured in such a way that a vacuum switch tube is in turn arranged in a further closed space, in which cleaned air or another gas mixture similar to air is located. In order to further increase the insulating capacity of such an arrangement, it is expedient for the vacuum switch tube, which is formed at least partially by an insulating material, for example an insulating ceramic, in the outer circumference, to be sheathed with a further insulating housing, in particular based on plastic, such as epoxy resin. This insulating housing is therefore arranged between the outer circumference of the vacuum switch tube and the gas space, which contains clean air, for example. In this case, the insulating housing is pushed over the vacuum tube or the insulating housing is cast around the vacuum tube in a casting process. In both alternative methods, it is always difficult to configure a boundary area between the vacuum tube and the insulating housing such that it is free of air bubbles or other inclusions. During operation, such bubbles in turn result in partial discharges in this region, whereby the material of the insulating housing is subject to erosion. The material is attacked at this point and thereby loses its electrical insulating capacity. In a worst case scenario, after relatively prolonged damage to the material of the insulating housing, a breakdown of the boundary layer may occur or a disruptive discharge outwards into the gas space may take place.

SUMMARY OF THE INVENTION

The object of the invention consists in providing an interrupter unit with a vacuum switch tube and an insulating housing, which, compared to the prior art, has improved protection against partial discharges in the boundary region between the vacuum switch tube and the insulating housing, and premature damage or erosion of the material of the insulating housing is therefore prevented.

The object is achieved in an interrupter unit having the following features:

The interrupter unit comprises a vacuum switch tube and an insulating housing, wherein the insulating housing has an inner surface and the vacuum switch tube is bordered at least partially by an electrically insulating structure material. The structure material in turn has an outer surface, wherein the insulating housing at least partially surrounds the vacuum switch tube. In an operational state of the interrupter unit, the inner surface of the insulating housing and the outer surface of the vacuum switch tube are separated from one another by an adhesion layer. The invention is notable in that both the inner surface and the outer surface are provided at least partially with a conductive layer so that, in a boundary region between the vacuum switch tube and the insulating housing, the following layer sequence is produced in the radially outward direction from a switch axis: proceeding firstly, from the inside out, is the structure material of the vacuum switch tube. This structure material has the outer surface, which is in turn provided with a conductive layer or comprises such a conductive layer. This is furthermore followed by an adhesion layer, which is surrounded by a further conductive layer at the insulating housing or at the inner surface thereof, and this further conductive layer is applied to the inner surface of the insulating housing. This is furthermore followed by a volume material of the insulating housing.

The described layer sequence comprises two electrically conductive layers, which border the adhesion layer on both sides as seen radially. During operation of the interrupter unit, in particular during a switch procedure in which a corresponding electric field is directed radially outwards from the switch axis, this means that the two conductive layers on the structure material of the vacuum switch tube on the one hand and on the inner surface of the insulating housing on the other each have the same potential. This in turn means that there is no electric field in the adhesion layer, which is located between the two conductive layers and in which air inclusions are also possibly present. The adhesion layer is therefore field-free. As a result of the lack of an electric field locally in the region of the adhesion layer, there is therefore also no partial discharge in the region of any air inclusions or gas bubbles and therefore furthermore also no local erosion of the affected material. The useful life of the combination of the interrupter unit and the insulating housing and the operational safety thereof is thus increased considerably compared to the prior art.

In this case, it should be noted that the adhesion layer is preferably a bonding layer, which is additionally incorporated between the two conductive layers. However, the two conductive layers can essentially also be configured such that they interact with one another as a result of a corresponding process treatment, for example as a result of heat treatment, in turn as a result of diffusion procedures, for example, so that the adhesion layer is formed in the boundary region between the two electrically conducting layers. The adhesion layer could therefore also result from the two conductive layers. The term electrically conductive should also be understood to mean a semiconducting material which consists of or comprises conventional semiconductor materials, for example silicon, silicon carbide or compound semiconductors, such as gallium arsenide. In this case, the electric conductivity of the layer is calculated such that the electric resistance of the layer in the axial direction is in a range between 108 and 1015 ohm.

It is furthermore expedient that the insulating housing has a decreasing permittivity in the radially outward direction starting from the switch axis. In this case, the permittivity at the outer edge of the insulating housing is preferably as close to 1 as possible, which means a slight jump in the field strength at the transition to the outer insulation medium, for example the cleaned air. Realistic values for the permittivity of suitable materials for the insulating housing, for example plastic materials, in particular based on epoxy resin, are between 1.2 and 2, in particular between 1.2 and 1.5. In this case, the permittivity in the insulating housing can decrease radially outwards in stages, which can be achieved by a coating of a different material in the insulating housing. A gradual change in the permittivity radially outwards can be expedient and is representable.

Further configurations of the invention:

Further features and further exemplary embodiments are explained in more detail with reference to the following drawings. These are purely schematic illustrations which do not constitute a restriction of the scope of protection.

DETAILED DESCRIPTION OF THE INVENTION

Figure 1:
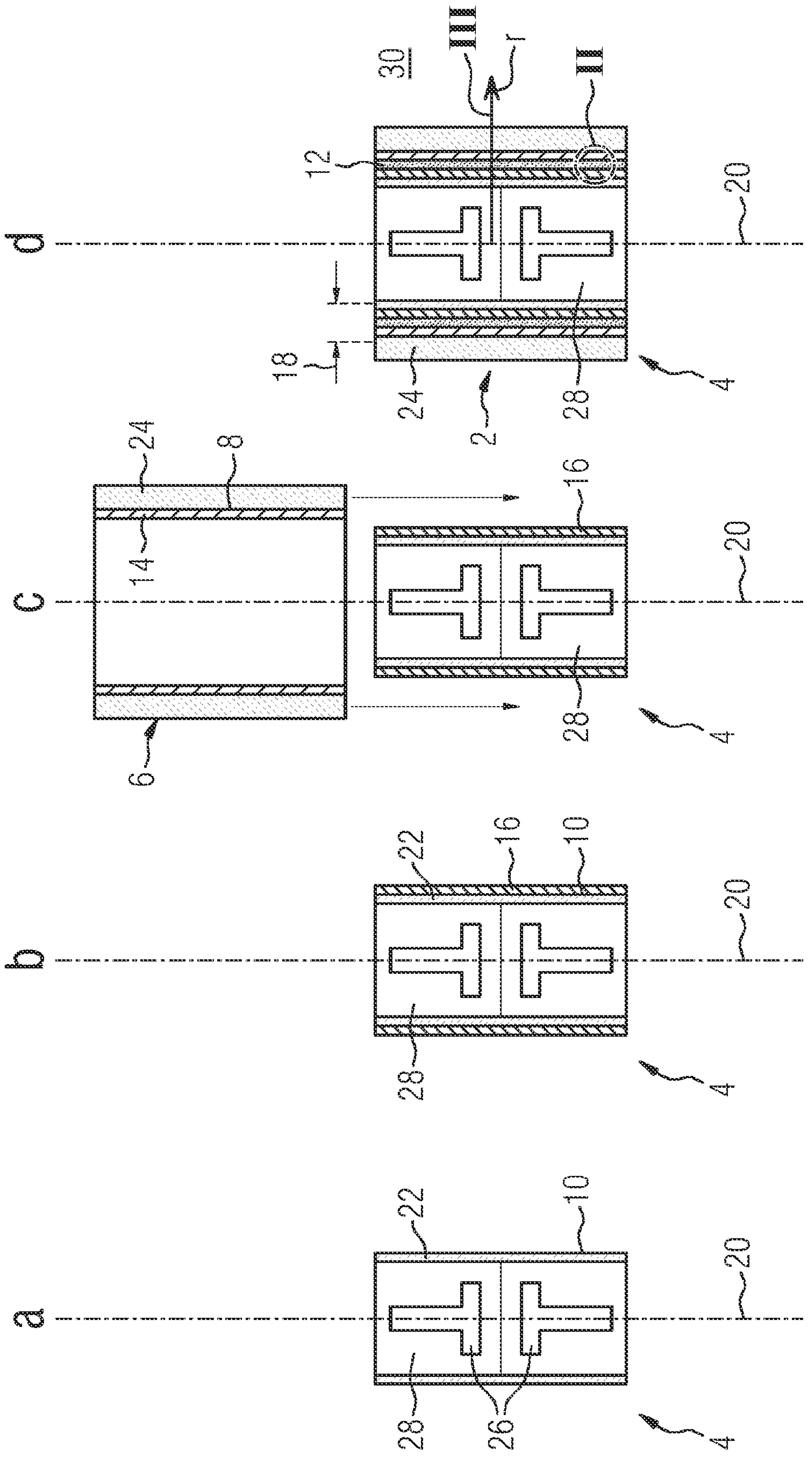
FIG. 1 shows an illustration of the manufacture of an interrupter unit with an insulating housing.

FIG. 1 shows the design and production of an interrupter unit 2 with a vacuum switch tube 4 and an insulating housing 6. In the illustration according to a on the far left, a vacuum switch tube 4 is shown, which has a structure material 22 which surrounds a vacuum space 28. Two switch contacts 26 are illustrated schematically in the vacuum space 28, wherein at least one of these can be moved in a translatory manner along a switch axis 20. In this case, the outer form of the vacuum switch tube 4 should be understood as being purely schematic; the structure material 22, which generally consists of or comprises an insulating ceramic material, generally represents merely part of a housing of a vacuum switch tube 4. In particular, in a region in which the switch contacts 26 move along the switch axis 20, the vacuum switch tube 4 is bordered externally by a metal outer material.

According to the partial figure b in FIG. 1, a conductive or semiconducting layer 16 is furthermore applied to an outer surface 10 of the vacuum tube 4 or the structure material 22. This refers for example to a silicon carbide material in powder form, which is integrated in an epoxy matrix and has an SiC fill level which is between 50 and 70 percent of the total volume. The resultant layer 16 has a conductivity which is calculated such that the electric resistance of the layer in the axial direction is in range between 108 and 1015 ohm. In this case, the conductivity of the layer 16 is determined according to the rated voltage and the specified geometrical parameters of the vacuum switch tube and the resultant electric field.

According to the partial figure c, an insulating housing 6 is furthermore pushed over the vacuum switch tube 4. In this case, as seen schematically here, the insulating housing 6 has a cylindrical configuration, wherein a form-locking mounting of the insulating housing 6 is shown in this case. It is essentially also possible or expedient to cast the insulating housing 6 onto the vacuum switch tube 4, in particular onto the structure material 22. In this case, however, a further conductive layer 14 is expedient, which is applied to an inner surface 8 of the insulating housing 6. The same conditions as those already explained with regard to the layer 14 apply for the layer 16; essentially, the layers 14 and 16 should be similar. However, they can also be different in terms of their material and their conductivity if this is required due to different adhesive conditions and consequently different coating methods. This is expedient when achieving the field-free state or field reduction (to be described in more detail) between the layers 14, 16.

Figure 2:
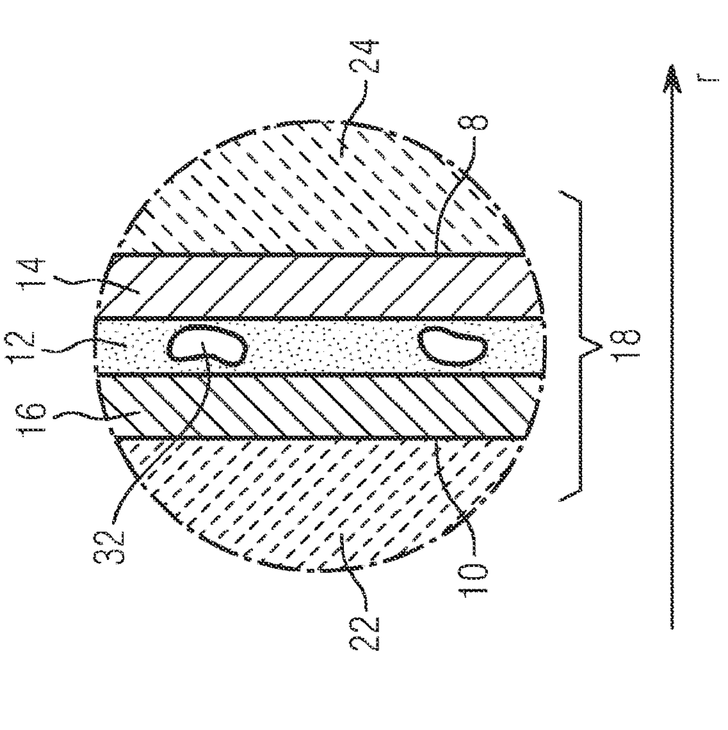
FIG. 2 shows an enlarged illustration of the boundary region between the insulating housing and the vacuum switch tube according to the detail II of FIG. 1.

The interrupter unit is illustrated schematically in a finished state in the partial figure d. In FIG. 1, the boundary region 18 between the structure material 22 of the vacuum switch tube 4 and a volume material 24 of the insulating housing 6 is illustrated by a circle, which is denoted by the reference sign II and whereof an enlarged illustration is shown in FIG. 2. FIG. 2 thus shows this detail, the boundary region 18 between the vacuum switch tube 4 and the insulating housing 6, wherein the structure material 22 (for example aluminum oxide) is shown on the left side of FIG. 2 as an outer border of the vacuum switch tube 4. This structure material 22 has an outer surface 10 to which a conductive layer 16 is applied. The composition of the conductive layer 16 has already been described in the previous paragraph. This is followed by an adhesion layer 12, which is preferably and substantially formed by an organic bonding agent. This is furthermore followed by a further electrically conducting layer 14 which, in terms of its composition, is very similar to the layer 16 or even consists of the same material. The further electrically conductive layer 14 is applied to an inner surface 8 of the insulating housing 6. This inner surface 8 is furthermore followed by the volume material 24 of the insulating housing 6. This material is preferably an epoxy resin.

According to FIG. 2, bubbles 32 are shown in the adhesion layer 12 between the layers 16 and 14. The formation of these bubbles 32 is unwelcome, but difficult to avoid when applying the insulating housing to the vacuum switch tube 4 or to the structure material 22 of the vacuum switch tube 4. It should be noted here that the sequence of the layers in the boundary region 18 is described along the arrow r, which describes a radial sequence outwards starting from the switch axis 20.

Figure 3:
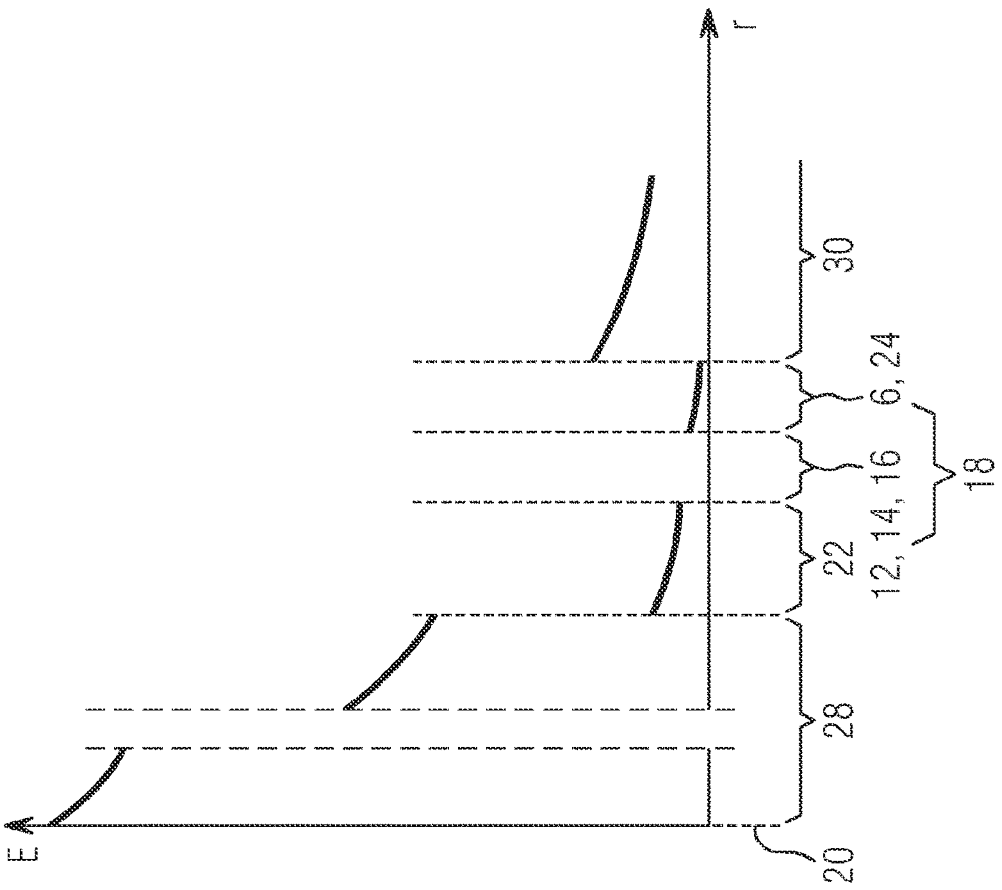
FIG. 3 shows a dependence of the electric field along the radial extent r according to III of FIG. 1.

FIG. 3 likewise shows the electric field as seen along the radial extent of the arrow r from the switch axis 20; it can be seen how the electric field weakens continuously in the vacuum space 28, starting from the switch axis 20. The offset of the field strength in FIG. 3, which is separated by two dashed lines in the region 28 in FIG. 3, merely shows that this refers to a section which implies that this region 28 in FIG. 3 would have a greater extent in an illustration which is true to scale. A real jump in the strength of the electric field occurs upon the presence of the structure material 22; in this case, the field penetrates from the vacuum into the structure material 22, which has a higher permittivity than the vacuum in the vacuum space 28, and the electric field is therefore greatly reduced. In this case, the electric field E also gradually decreases radially outwards.

The layers 12, 14 and 16 furthermore proceed along the arrow r in the radial direction. It can be seen in FIG. 3 that an electric field is not present in this region. This is followed by the volume material 24 of the insulating housing 6, in which the electric field E furthermore decreases until the air space 30, which likewise has an insulating effect, begins at the outer surface of the insulating housing 6. Cleaned air, but also normal air, i.e. an external atmosphere, but also a mixture similar to air, which comprises nitrogen and carbon dioxide, can be located in this air space 30. This refers to a further insulation stage for the interrupter unit 2, in which the electric field furthermore decreases.

With regard to the electric field, a jump can in turn be seen between the material 24 of the insulating housing 6 in FIG. 3. This is because the permittivity of the air or the gas which is applied outside the insulating housing 6 is close to 1. The material 24 of the insulating housing 6 generally has a higher permittivity, wherein it would be desirable for the permittivity of the material 24 to decrease along the radius so that the jump, which can be seen here between the transition from 24 to the region 30, is reduced and is as small as possible. To this end, it can be expedient for the volume material 24 of the insulating housing 6 to have different permittivities along the arrow 4. The permittivity of the material in the outer region should essentially be as low as possible, i.e. as close to 1 as possible. The permittivity can be higher in the interior. This can be achieved by a layered construction of the volume material 24 so that two or more layers of different materials with different permittivities can be placed concentrically around one another. However, it is also expedient to configure the material such that a gradient behavior of the permittivity in the direction of the arrow r is realized.

The electrically conductive layers 14 and 16, which include the adhesion layer 12, are arranged as described in the regions 12, 14 and 16, in which, according to FIG. 3, the electric field is zero or close to zero. As illustrated in FIG. 2, in the adhesion layer 12, bubbles 32 can form in which a partial discharge may occur when an electric field is applied, whereby the material of the adhesion layer or the surrounding material, or the volume material 24 of the insulating housing 6 is eroded and ultimately aged. This aging process can reduce the disruptive strength and therefore also the useful life of the combination of the insulating housing 6 and the interrupter unit 2 and therefore necessitate earlier replacement. As a result of the described layers 14 and 16, the adhesion layer 12 is, however, integrated such that the same potential is applied at its inner and outer side in each case and the electric field therefore drops to zero there and, as a result, a partial discharge also does not take place in the critical region of the adhesion layer 12, in which bubbles 32 can form. The risk of erosion in this transition or boundary region 18 is reduced to virtually zero as a result of the described layers 14 and 16.

It should be noted here that the adhesion layer 12 is generally a bonding layer, which is suitable for bonding the material 24 of the insulating housing 6 to the structure material 22 of the vacuum switch tube 4. It can essentially also be expedient to apply the layers 14 and 16 directly to one another and to subject them to an appropriate treatment so that an adhesion layer forms between them, or the adhesion layer 12 is formed directly by the layers 14 and 16. This can refer to diffusion processes, for example, or chemical conversion in a further boundary region between these two layers 14 and 16. This measure also contributes to suppressing bubbles 32 and, should they occur, to rendering them harmless in terms of a partial discharge as a result of the integration in materials with the same potential.

LIST OF REFERENCE SIGNS

2 Interrupter unit
4 Vacuum switch tube
6 Insulating housing
8 Inner surface of the insulating housing
10 Outer surface of the vacuum tube
12 Adhesion layer
14 Conductive layer of the inner surface
16 Conductive layer of the outer surface
18 Boundary region
20 Switch axis
22 Structure material
24 Vacuum material of the insulating housing
26 Switch contacts
28 Vacuum space
30 Air space/gas space
32 Bubbles

The invention claimed is:

1. An interrupter unit, comprising:

a vacuum switch tube;

an insulating housing at least partially surrounding said vacuum switch tube, said insulating housing having an inner surface provided at least partially with an electrically conductive layer and said insulating housing having a volume material;

an electrically insulating structure material at least partially bordering said vacuum switch tube, said electrically insulating structure material having an outer surface provided at least partially with an electrically conductive layer;

an adhesion layer separating said inner surface of said insulating housing and said outer surface of said vacuum switch tube in an operational state of the interrupter unit; and a boundary region between said vacuum switch tube and said insulating housing having a layer sequence as follows in a radially outward direction from a switch axis: said structure material of said vacuum switch tube, said outer surface of said structure material, said conductive layer at said outer surface of said structure material, said adhesion layer, said conductive layer at said insulating housing, said inner surface of said insulating housing, and said volume material of said insulating housing.

2. The interrupter unit according to claim 1, wherein said conductive layers include a semiconducting material.

3. The interrupter unit according to claim 1, wherein said conductive layers each have a conductivity providing an electric resistance of said conductive layer in an axial direction in a range between 108 and 1015 ohms.

4. The interrupter unit according to claim 1, wherein said conductive layers contain silicon carbide.

5. The interrupter unit according to claim 1, wherein said insulating housing has a decreasing permittivity in the radially outward direction starting from the switch axis.

6. The interrupter unit according to claim 5, wherein the permittivity of said insulating housing decreases radially outwards in stages.

7. The interrupter unit according to claim 1, wherein said insulating housing includes a radially outer edge having a permittivity of between 1 and 2.

8. The interrupter unit according to claim 1, wherein said insulating housing includes a radially outer edge having a permittivity of between 1.2 and 1.5.

9. The interrupter unit according to claim 1, wherein said insulating housing is formed substantially of a plastic material.

10. The interrupter unit according to claim 1, wherein said insulating housing is formed of an epoxy resin.

* * * * *